United States Patent [19]
Ratzlaff et al.

[11] Patent Number: 6,029,434
[45] Date of Patent: Feb. 29, 2000

[54] DOWN TURNING STUB AUGERS ON WIDE PICK-UP FOR ROUND BALERS

[75] Inventors: Howard J. Ratzlaff, Hesston; J. Dale Anderson, Canton, both of Kans.

[73] Assignee: Hay & Forage Industries, Hesston, Kans.

[21] Appl. No.: 08/731,764

[22] Filed: Oct. 18, 1996

[51] Int. Cl.$^7$ ................................................. A01D 39/00
[52] U.S. Cl. ............................................. 56/341; 100/88
[58] Field of Search ............................ 56/341, 342, 343, 56/344; 100/88, 89; 53/587, 116, 118

[56] References Cited

U.S. PATENT DOCUMENTS

| | | |
|---|---|---|
| 4,782,651 | 11/1988 | Ratzlaff . |
| 4,993,217 | 2/1991 | Pfrimmer et al. . |
| 5,127,217 | 7/1992 | Fell et al. .................................... 56/341 |
| 5,450,704 | 9/1995 | Clostermeyer . |
| 5,595,055 | 1/1997 | Horchler, Jr. et al. ..................... 56/341 |

OTHER PUBLICATIONS

Case IH Brochure No. AE 102055, entitled "Balers—Round and Rectangular", front and back cover sheets and pp. 6–9 (1995).
New Holland Operator's Manual for "Round Baler 640, 650, 660", Issue 8–93, form No. 0 (640, 650, 660)—7 1/2 M–893P, Part No. 42064032, front and back coversheets, inside front coversheet, and pp. 2–2, 2–3, 3–6, 4–5 (1993).

*Primary Examiner*—H. Shackelford
*Attorney, Agent, or Firm*—Hovey, Williams, Timmons & Collins

[57] ABSTRACT

A round baler has a pickup header that is wider than the baling chamber and its inlet so that over-width windrows can be picked up by the machine in spite of its relatively narrower chamber. In order to reduce the width of the crop stream for introduction into the chamber, the machine is provided with a pair of laterally spaced apart, axially aligned, transverse stub augers that engage opposite outboard margins of the stream and converge them inwardly toward the main body of the flow. At the point where the outboard materials are discharged into the central body of the stream, a stuffer mechanism takes control of the stream and charges the materials up into the baling chamber. The augers are driven in such a direction that their front portions rotate down and under the auger shafts so that the outboard crop materials are likewise fed down and under the augers as they are converged toward the center. The inwardly augered materials are released by the augers down at the operating level of the stuffer, contributing to positive, orderly flow of materials through this region and into the baling chamber.

6 Claims, 6 Drawing Sheets

DOWN TURNING STUB AUGERS ON WIDE PICK-UP FOR ROUND BALERS

CROSS-REFERENCE TO RELATED APPLICATIONS

See also the following contemporaneously filed applications for U.S. Letters Patent: Ser. No. 08/731,768, entitled ROUND BALER HAVING TAILGATE-RESPONSIVE CLUTCH; Ser. No. 08/733,758, entitled OVER-THE-TOP SUPPORT ARM FOR PICK-UP GAUGE WHEEL OF A BALER; Ser. No. 08/733,757, entitled TALL SLEEVES FOR ROUND BALER DRIVE ROLLS; Ser. No. 08/731, 395, entitled EASED INLET TAILGATE ROLL ARRANGEMENT FOR VARIABLE CHAMBER ROUND BALER; and Ser. No. 08/731,767, entitled END OF ROUND BALE TWINE GUIDES.

TECHNICAL FIELD

The present invention relates to round balers and, more particularly, to round balers that are capable of picking up and baling windrows that are wider than the baling chamber of the machine without adversely affecting the smooth and orderly flow of materials into the baling chamber.

BACKGROUND

Windrows are typically rounded at their lateral margins and progressively slope down from a maximum height at the center to a minimum height at their edges. Consequently, the finished bale tends to be larger in the center than at its opposite ends. To correct this tendency, more material can be added to the outer edges of the windrow, such as by laying down a pair of windrows side-by-side to produce one large "double windrow". However, adding a second windrow alongside the first sometimes causes the windrow to be over-width, so that a standard pickup cannot reach the widest portions of the windrow unless it is equipped with gathering wheels or other suitable devices. Such products converge and consolidate the materials while they are still on the ground, just ahead of and before engagement by the pickup. Another way of providing the capability of handling wide windrows is to design the baler for two-stage feeding from the ground to the baling chamber. In this approach the pickup serves as the first stage of the feeding mechanism and is made overly wide, compared to the bale chamber, so that the pickup can easily reach and accept all portions of the wide windrow. Once picked up, the crop is then converged toward the center by suitable mechanism such as a pair of oppositely disposed stub augers before the materials are then delivered into the baling chamber by the second stage stuffing forks or other feeder. However, currently available two-stage balers with this type of over-width capability sometimes have difficulties in making the critical transfer of material from the pickup to the stuffer mechanism. Not only is the loose material leaving the control of one positive feeding element and moving to another at this point, but also the wide, outboard margins of the stream are being fed centrally and merged into the main body of flow in this same region, which makes it difficult for the second feeder to take control of the outboard materials, tends to create turbulence, and causes over-crowding. The problem is compounded in high moisture conditions. Sometimes, plugging occurs.

SUMMARY OF THE INVENTION

Accordingly, one important object of the present invention is to provide a round baler that can readily accommodate windrows that are wider than the baling chamber itself even in relatively high moisture conditions, without the need for add-on rakes, wheels or other gathering devices ahead of the pickup. In this regard, it is similarly important to provide a baler in which the crop flow from the pickup to the baling chamber is smooth and orderly, without excessive turbulence, loss of control over the crop, or a tendency to plug.

In carrying out the foregoing and other important objects, the present invention contemplates a baler in which the pickup is wider than the baling chamber and its inlet to such an extent that the pickup is fully capable of reaching even the lateral-most extremes of the wide windrow. The main, central body of the picked up material flows straight back to a stuffer mechanism that projects up through slots in an upwardly inclined floor ramp, but opposite outboard margins of the stream are engaged by opposed stub augers at the transition point between the pickup tines and the stuffer and are conveyed downwardly under the stub augers as they are being directed inwardly toward the center of the stream. Consequently, the centrally converged outboard margins of the stream are presented to the stuffer down low at the level where the stuffer operates so that the materials are at the optimum location to be received and taken under control by the stuffer. In some prior art arrangements where stub augers have been used, the augers rotate in such a manner that outboard margins of the stream are fed up and over the tops of the augers so that the materials tend to be presented to the feeding forks at levels somewhat above the main body of the stream. The stuffer forks thus have less positive control over the incoming materials at this point, leading to a tendency for the unrestricted materials to bunch up and over-whelm the capacity of the stuffer mechanism. Moreover, there may be a tendency for extraneous portions of the relatively deep flow of materials to become caught in overhead moving parts or mechanism, which leads to trash and residue build-up in the machine.

DETAILED DESCRIPTION

The two-stage baler 10 of FIGS. 1–6 has a chassis 12 supported for movement along the ground by a pair of left and right ground wheels 14 and 16 respectively. A pair of upright, laterally spaced apart, left and right sidewalls 18 and 20 are carried on the chassis 12 to serve as the opposite end extremities of an internal baling chamber 22 shown in FIGS. 1 and 5. Cooperating with the sidewalls 18,20 in defining the baling chamber 22 are a number of flexible, endless belts 24 entrained around a number of transverse rolls. Beginning with the lower front extremity of the chamber 22 and proceeding in a generally clockwise direction, such rolls include a first drive roll 26, a second drive roll 28, back-wrapped idler roll 30 (which may be omitted depending upon the angle of the belts 24 as they leave the second drive roll 28 and proceed to the upper part of the baler), a series of slack take-up rolls 32, 34, 36, 38 and 40 in the upper portion of the baler, a relatively large diameter guide roll 42 at the top of the chamber 24, a pair of bale tension rolls 44 and 46 below the guide roll 42, an upper rear roll 48 at the back of the baler, a lower rear roll 50 below the roll 48, and a pair of tailgate rolls 52 and 54 forwardly of the lower rear roll 50 and generally adjacent the lower rear extremity of the chamber 24 when the latter is in its smallest, start-up size. The rolls 26, 28, 30, 32, 36, 40, 42, 48, 50, 52 and 54 completely span the sidewalls 18, 20 and are journaled thereby. On the other hand, the two upper rolls 34 and 38 are carried a swingable tension arm device 56 for vertical swinging movement between the solid and phantom line positions of FIG. 1, the tension arm device 56 being biased yieldably downwardly toward its phantom line position by a pair of hydraulic cylinders 58 and 60 outside the chamber 24 on the opposite left and right sidewalls 18,20 respectively. In a somewhat similar way, the two rolls 44 and 46 are carried by a vertically swingable arm assembly 62 for movement between the upper solid line position and the lower phantom position in FIG. 1. The arm device 62 is biased yieldably downwardly toward its phantom line position of FIG. 1 by a pair of hydraulic cylinders 64 and 66 on the outside of the baler on sidewalls 18 and 20 respectively.

Figures 1, 1A:
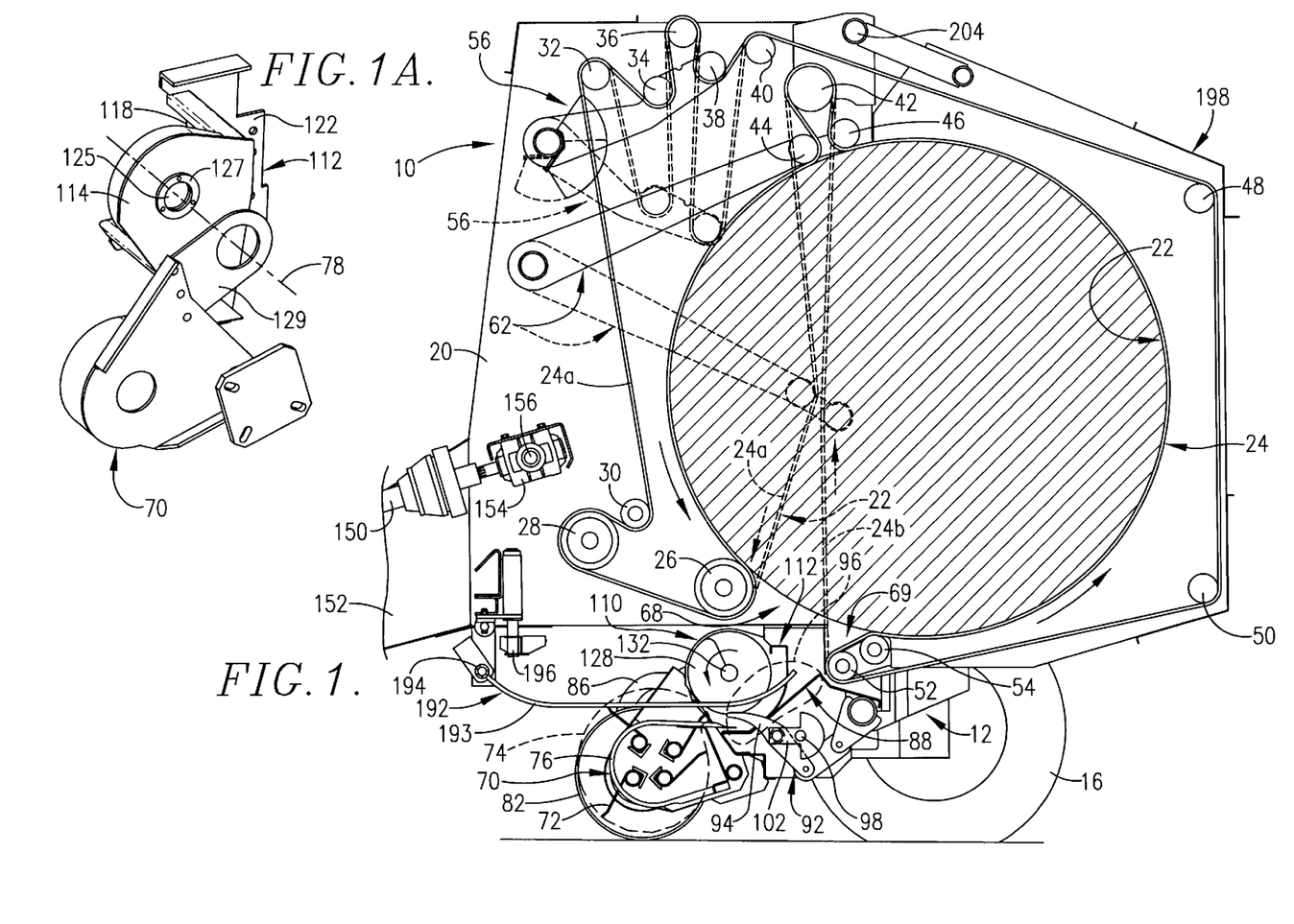
FIG. 1 is a fragmentary side elevational view of a baler incorporating the principles of the present invention with its near sidewall removed to reveal internal details of construction, the solid line positions of the internal components of the machine illustrating the condition of things when a bale has been fully formed in the machine while the phantom line position of the components illustrates the condition when the chamber is small and upright prior to starting a bale.
FIG. 1a is an exploded illustration of parts at the left end of the pickup header showing its manner of pivotal mounting.

As illustrated in FIG. 1, the baling chamber 24 is defined at its front by a front stretch 24a of the belts 24 and its rear by a rear stretch 24b. The front stretch 24a is looped under the first drive roll 26 and proceeds upwardly and forwardly to the second drive roll 28, while the rear stretch 24b is looped under the tailgate 52 and extends back to the rear roll 50. The front and rear stretches 24a and 24b are initially generally upright as shown in phantom in FIG. 1 in which the baling chamber 24 is in its smallest, bale starting dimension and configuration. In this respect, at start up the chamber 24 is generally vertically disposed with the two stretches 24a and 24b converging upwardly to an apex caused by the stretches 24a and 24b passing between the two guide rollers 44 and 46 of arm assembly 62, which is in its lower, starting position at this time. As a bale grows within the chamber 24, the front and rear stretches 24a and 24b become bowed out forwardly and rearwardly respectively and the arm assembly 62 rises in the baler, all as shown in full lines in FIG. 1.

The belts 24 are driven in such a direction that the rear belt stretch 24b is initially moving upwardly when the chamber 22 is in its start up configuration, while the front belt stretch 24a is moving downwardly and forwardly toward the drive roll 26. The drive roll 26 pulls downwardly on the front stretch 24a, while the second drive roll 28 pulls the belt stretch from the drive roll 26 in an upward and forward direction. The two drive rolls 26 and 28 may be provided with a number of special sleeves thereon to reduce trash accumulation as disclosed in co-pending application for U.S. Letters Patent Ser. No. 08/733,757 filed Oct. 18, 1996 in the names of J. Dale Anderson and LaVern R. Goossen, titled TALL SLEEVES FOR ROUND BALER DRIVE ROLLS.

An inlet 68 to the chamber 22 is defined at the bottom of the chamber 22 between the two rolls 26 and 52. Although the size of the chamber 22 above the inlet 68 varies depending upon the size of the bale, the inlet 68 remains the same size regardless of bale size. It will be noted, however, that while the rear belt stretch 24b is initially almost exactly vertical when the chamber is empty, later in the baling process the rear stretch 24b lays down in a rearward direction against the roll 54. Thus, in a sense, the lower rear extremity of the inlet 68 is transformed into an upwardly and rearwardly inclined infeed ramp after the bale has progressed beyond the initial stages of its development, thus enlarging and making more aggressive a receiving nip 69 that is formed between the bale and the rolls 52,54 during the baling process. Details of the construction of the baler to provide such a nip and its manner of formation and function are disclosed in copending application Ser. No. 08/731,395, filed Oct. 18, 1996, in the names of Ratzlaff, Howard J. et al. and titled Eased Inlet Tailgate Roll Arrangement for Variable Chamber Round Baler.

The chassis 12 supports a pickup header 70 at a location downwardly and forwardly from the chamber inlet 68. The pickup header 70 includes a plurality of retracting finger tines 72 of conventional design that move through the broken line path of travel 74 shown in FIGS. 1 and 5. The tines 74 move between a series of laterally spaced wrapper straps 76 in the well known manner to lift crop material off the ground and deliver it generally rearwardly toward the inlet 68 during operation. As shown most clearly in FIG. 6, the pickup header 70 is considerably wider than the bale chamber 22 and its inlet 68 (not shown in FIG. 6 but corresponding in width to the chamber 22). The header 70 can swing up and down about a transverse axis 78 (FIG. 1a) coinciding with the axis of rotation of the consolidating stub augers (hereinafter described) to the extent needed to accommodate changes in ground contour sensed by a pair of left and right gauge wheels 80 and 82 respectively on the header. The gauge wheels 80 and 82 are secured to the header 70 by special upwardly arched arms 84 and 86 respectively, such mounting arrangement for the gauge wheels 80,82 being the subject of co-pending application for U.S. Letters Patent Ser. No. 08/733,758 filed Oct. 18, 1996 in the names of J. Dale Anderson and LaVern R. Goossen, titled OVER-THE-TOP SUPPORT AIM FOR PICK-UP GAUGE WHEEL OF A BALER.

Figure 4:
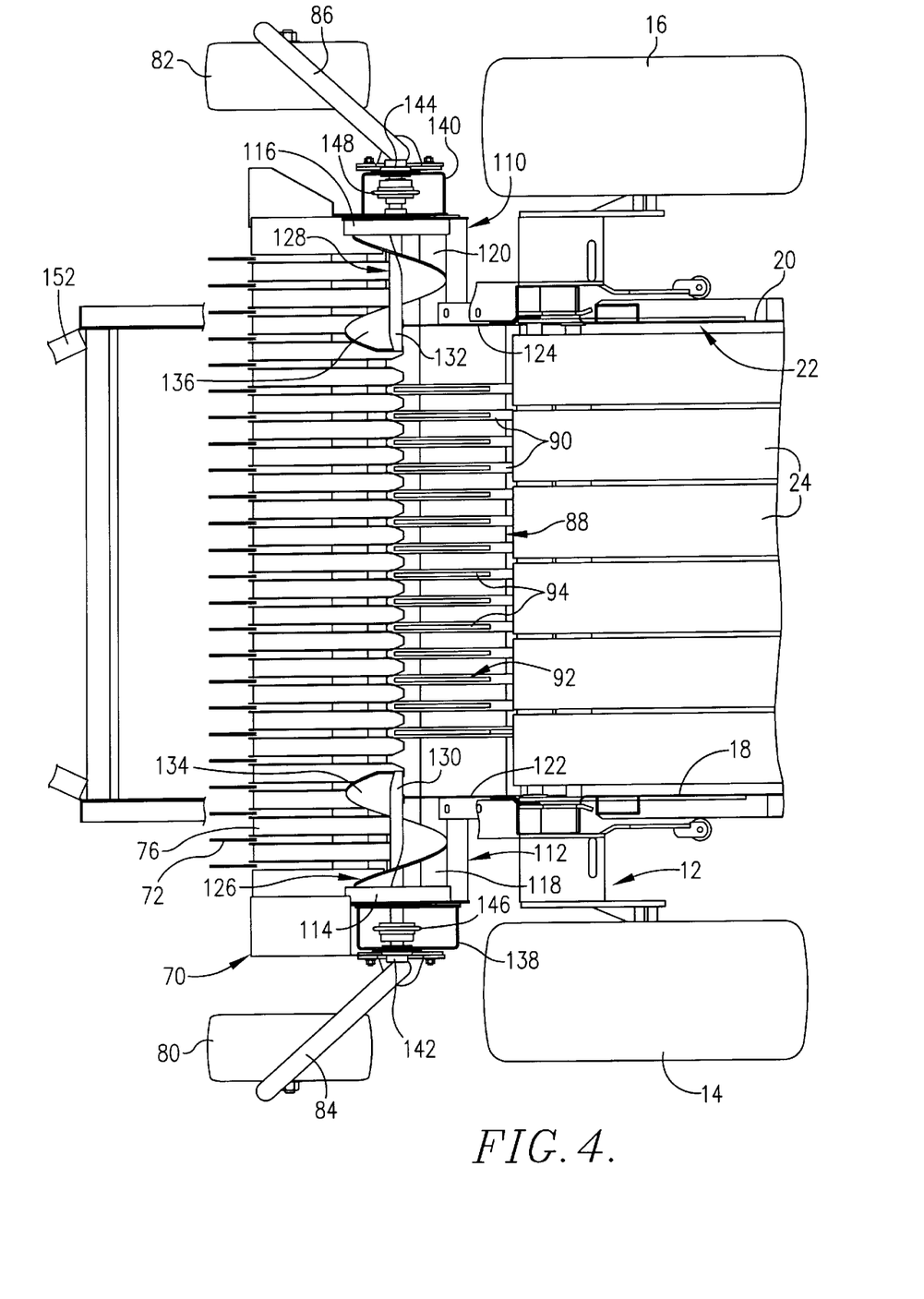
FIG. 4 is a fragmentary top plan view of the infeed area of the baler looking downwardly from a position just above the stub augers and below the overhead drive rolls for the forming belts, the rear belts of the chamber being laid back as if a full size bale were present in the chamber.
Figure 6:
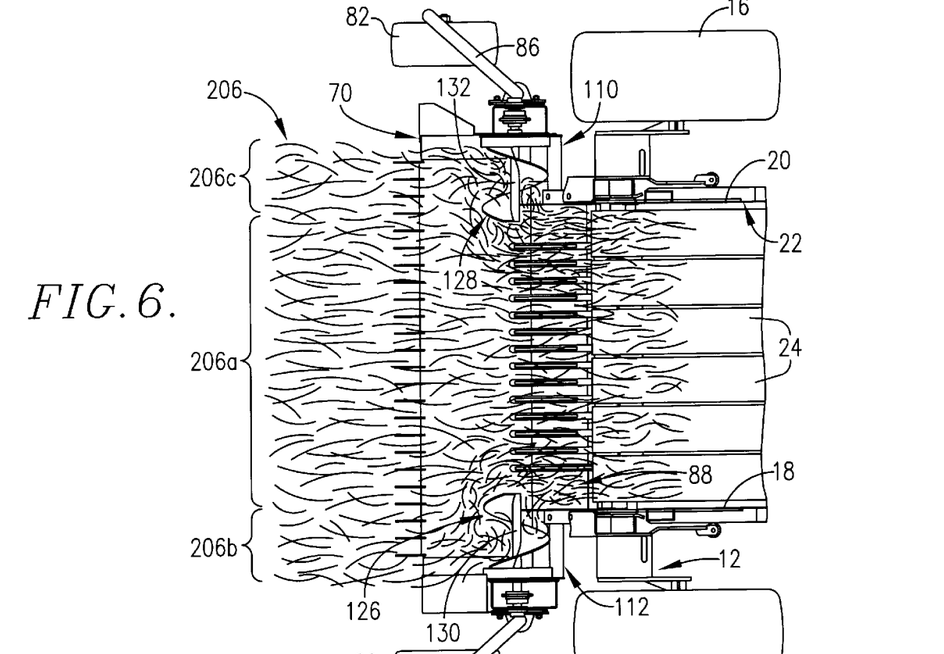
FIG. 6 is a fragmentary top plan view similar to FIG. 4 but on a reduced scale and illustrating the manner in which the outboard lateral margins of the crop stream are converged inwardly at the transition point between the pickup and the stuffer mechanism.

The chassis 12 also supports an upwardly and rearwardly inclined ramp 88 behind the pickup header 70 and forwardly of and below the inlet 68. As shown in FIGS. 4 and 6, the ramp 88 is the same width as the baling chamber 22, thus also corresponding in width to the inlet 68. In the preferred embodiment as illustrated herein, the ramp 88 is of constant width between its upper and lower ends, although it is conceivable that the ramp could also taper somewhat from a wider lower end toward a narrower upper end.

Figure 5:
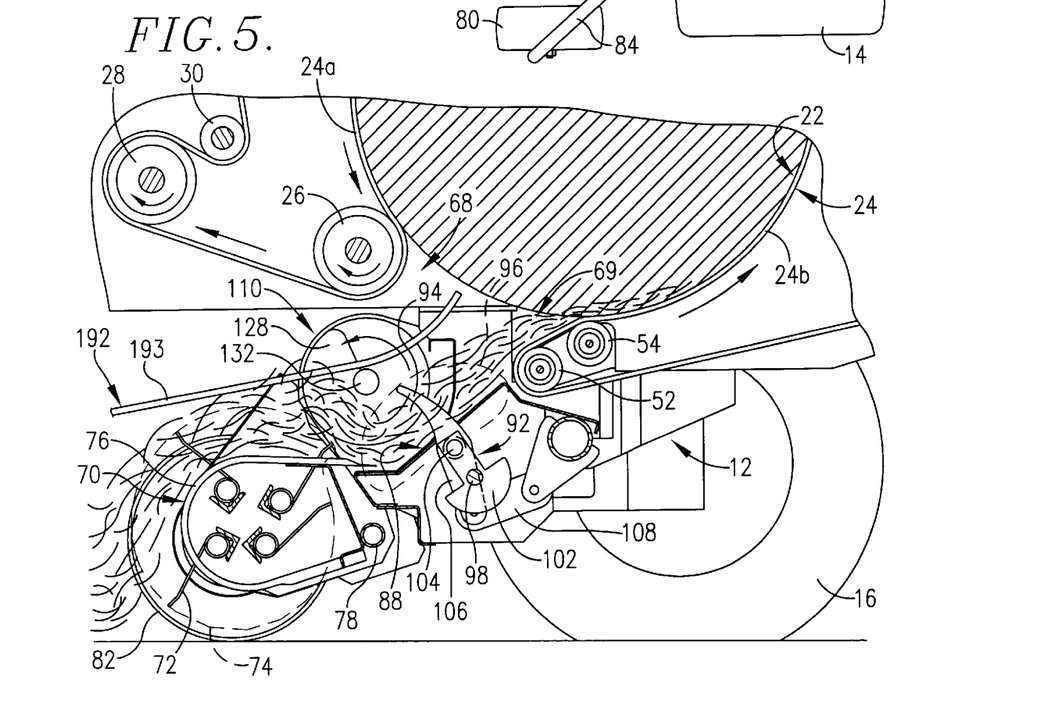
FIG. 5 is a fragmentary vertical cross-sectional view through the inlet area of the baler illustrating the manner in which the crops stream flows from the pickup into the baling chamber.

As shown in FIGS. 1 and 5, the angle of upward incline of the ramp 88 is approximately the same as the angle of incline of the rear belt stretch 24b when it lays back against the roll 54 following the initial stages of bale formation. Furthermore, the upper end of the ramp 88 is almost flush with the rear belt stretch 24b when the latter is laid back against the roll 54 so that crop material moving up the ramp 88 and transferring to the belt stretch 24b as shown in FIG. 5 can readily make that transition.

As illustrated most clearly in FIGS. 4 and 6, the ramp 88 is provided with a series of laterally spaced slots 90 that extend in the direction of crop travel from the pickup toward the baling chamber and which traverse the ramp from its lower end to its upper end. A stuffer mechanism broadly denoted by the numeral 92 is primarily housed below the ramp 88 but includes a series of rigid teeth 94 that project upwardly through corresponding ones of the slots 90 for feeding successive charges of crop material up the ramp 88 and into the bale chamber 22 through the inlet 68. The outermost tips of the teeth 94 move in a generally kidney shaped path of travel 96 as illustrated in phantom lines in FIGS. 1 and 5. As shown, the path of travel 96 extends from a lower point immediately adjacent the upper rear extremity of the path of travel 74 of the pickup tines to the lower front extremity of the inlet 68, i.e., immediately in front of the roll 52.

The stuffer 92 includes a pair of axially aligned stub shafts 98 and 100 (FIGS. 1, 2, 3 and 5) on opposite sides of the baler. As illustrated with respect to the left stub shaft 98 (which is a drive shaft) in FIGS. 1 and 5, each stub shaft 98,100 has a crank 102 fixed thereto that journals the corresponding end of a cross shaft 104 extending clear across the baler below the ramp 58. The teeth 94 are all rigidly affixed to the cross shaft 104, the left endmost tooth 94 (FIG. 5) having a downward extension 106 that is pivotally connected to a control link 108 pivoted to the chassis 12. Thus, when stub shaft 98 rotates in a clockwise direction viewing FIG. 5, the teeth 94 project up through the slots 90 and sweep upwardly along the ramp during stuffing strokes before then retracting down below the ramp and moving toward the lower end of the ramp during return strokes.

An auger assembly 110 is positioned at the lower end of the ramp 88 for engaging outboard margins of the crop stream being conveyed rearwardly by the pickup 70 and for consolidating or converging such lateral margins toward the center of the machine. The main purpose of the auger assembly 110 is to reduce the width of the incoming crop flow from its over width dimension as shown in FIG. 6 to a dimension corresponding in width to that of the baling chamber 22 and the inlet 68.

As shown in FIG. 4, the auger assembly 110 includes an auger pan 112 (see also FIG. 1a) having a pair of opposite end walls 114 and 116, a pair of curved back walls 118 and 120 that project inwardly for a relatively short distance from the back edges of the respective end walls 114, 116, and a pair of laterally spaced inner walls 122 and 124 that extend rearwardly from the inner termination of the concave back walls 118,120. The two back walls 118,120 terminate at their inboard extremities at locations aligned with the corresponding sidewalls 18 and 20 of the baler and with opposite ends of the inlet 68. Thus, there is a large amount of space between the opposite interior extremities of the back walls 118,120, and also between the inner walls 122 and 124, which is occupied at its lower extremity by the ramp 88. Each end wall 114,116 has a hole 125 (FIG. 1a) surrounded by an annular, outwardly projecting support ring 127 that swingably journals a corresponding, rearwardly projecting mounting arm 129 on the pickup header 70 (to provide the swingability of the header 70.)

The auger assembly 110 further includes a pair of stub augers 126 and 128 that are supported by the opposite end walls 114,116 generally above and forwardly of the back walls 118,120. The stub augers 126 and 128 have respective auger shafts 130 and 132 that project through holes 125 and are journaled by the corresponding end walls 114 and 116 for rotation about axially aligned but spaced apart axes coinciding with the swing axis 78 of pickup header 70. The two auger shafts 130 and 132 are provided with respective helical vanes 134 and 136 for acting upon the crop material and moving it inwardly. It will be noted from FIGS. 4 and 5, for example, that the stub augers 130,132 are positioned directly above the point at which outboard tine fingers 72 release the outboard margins of the crop flow. The augers 130,132 are also positioned in line with the receiving end of the path of travel 96 of the stuffer teeth 94. Furthermore, as shown in FIG. 4, it will be seen that the inner discharge ends of the augers 130 and 132 are located in relatively close proximity to the outermost ones of the stuffer teeth 94.

As shown in FIG. 4, the auger shafts 130 and 132 project outwardly through the end walls 114,116 and into corresponding box like housings 138 and 140 on the pickup header 70. Bearings 142 and 144 journal the outer ends of the respective auger shafts 130 and 132 on the outer wall of the housings 138,140. Each auger shaft 130,132 carries its own drive sprocket within the housing, denoted by the numerals 146 and 148.

Figure 2:
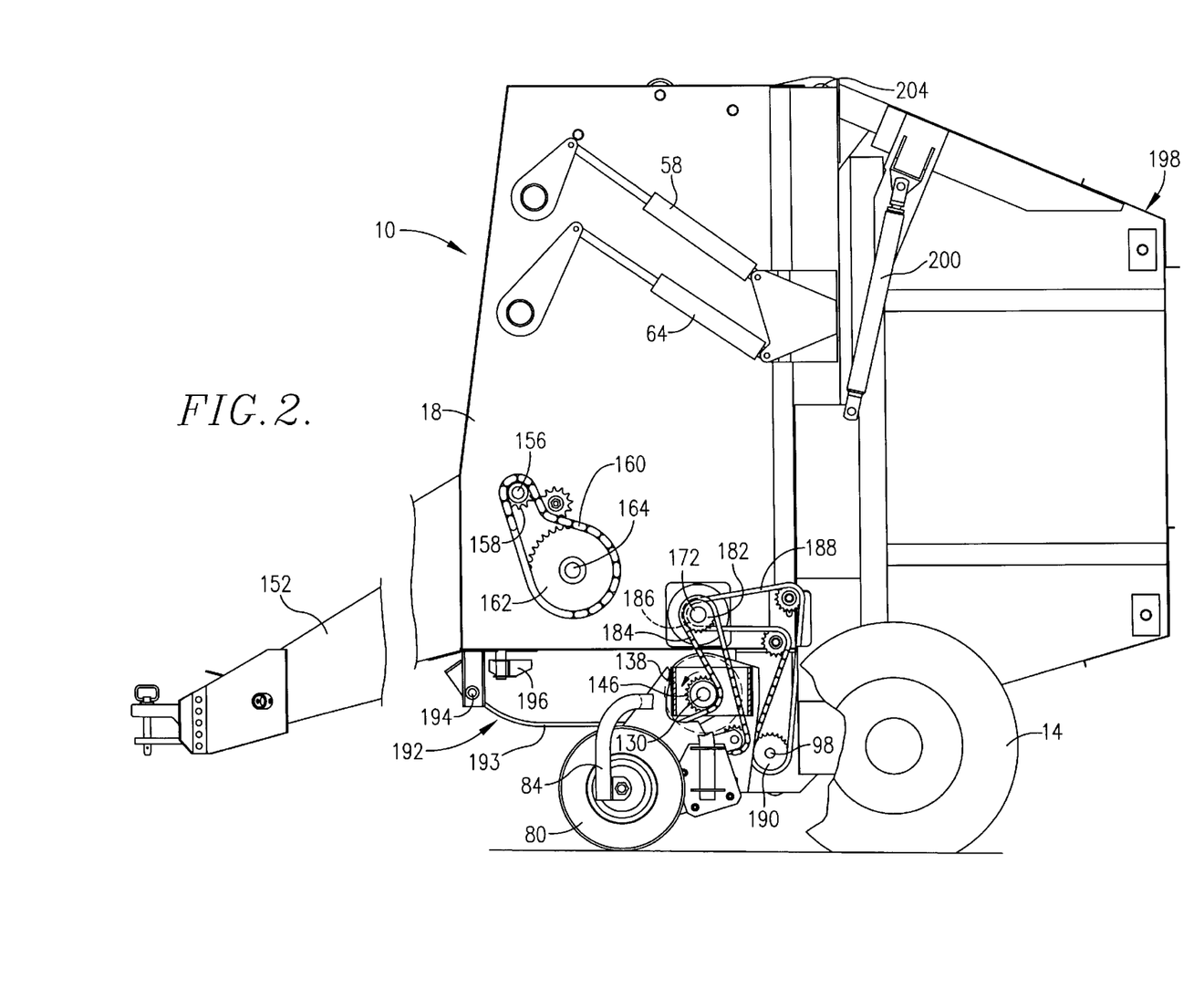
FIG. 2 is a fragmentary left side elevational view of the baler illustrating external drive components of the machine.

As illustrated in FIG. 1, a mechanical drive line 150 situated generally above the towing tongue 152 of the machine supplies input driving power to various operating components of the baler. The drive line 150 is connected with a right angle gear box 154 having an output shaft 156 that extends across the left, front portion of the baler and exits through the left sidewall 18 (FIG. 2). At that location, the output shaft 156 is provided with a sprocket 158 that is entrained by a chain 160 wrapped around a large sprocket 162 on a shaft 164. The shaft 164 is fixed to and comprises part of the front drive roll 28 such that the front drive roll 28 receives its driving power from the shaft 164.

Figure 3:
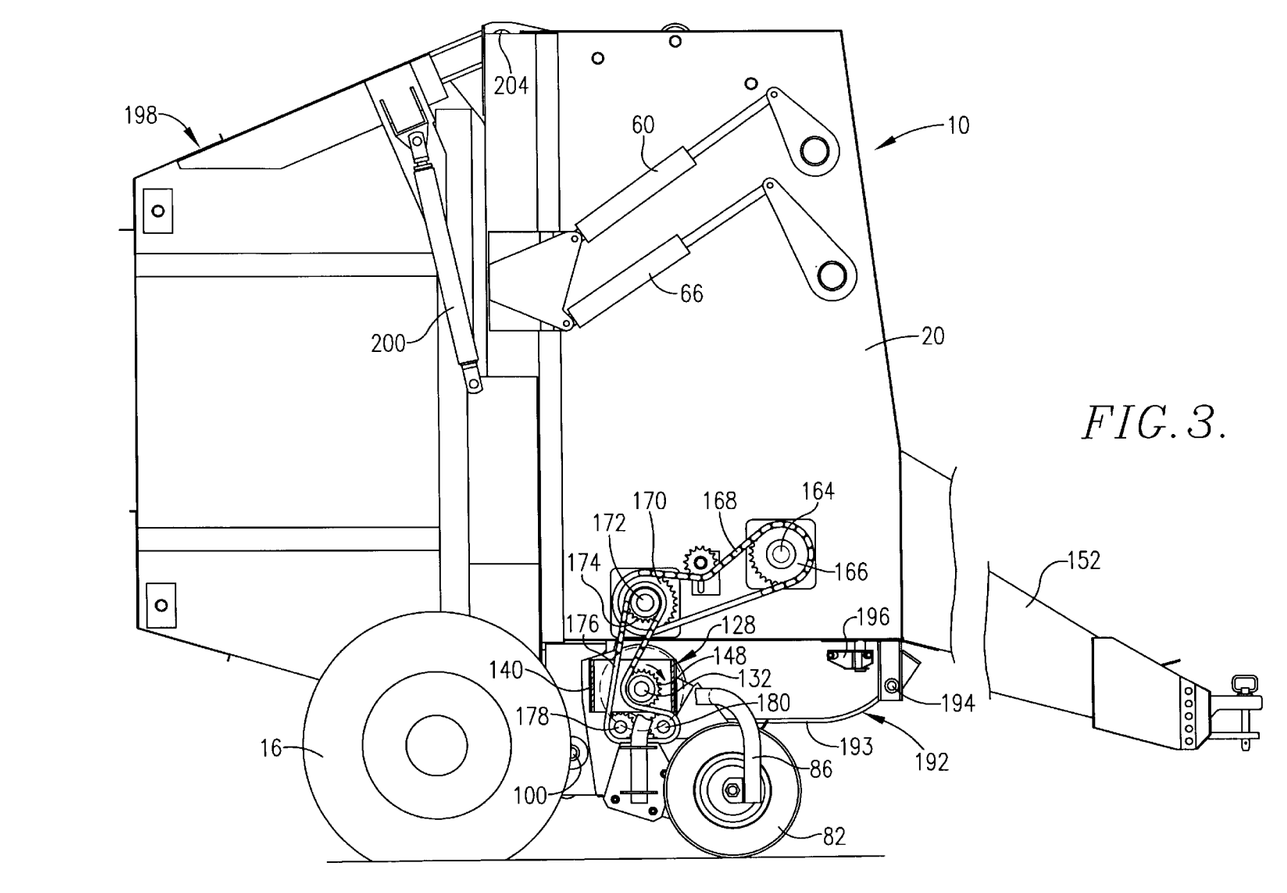
FIG. 3 is a fragmentary right side elevational view of the machine.

The shaft 164 passes entirely across the baler and exits through the right sidewall 20 as shown in FIG. 3. A sprocket 166 at that location is entrained by a drive chain 168 that wraps around a downwardly and rearwardly located sprocket 170. The sprocket 170 is fixed to a shaft 172 that forms a part of and is fixed to the lower rear drive roll 26 inside of the baler. Thus, the lower rear drive roll 26 receives its driving input power from the shaft 172.

In addition to the sprocket 170, the shaft 172 also carries a smaller sprocket 174 that is affixed thereto outboard of the sprocket 170. The sprocket 174 is entrained by a drive chain 176 that is backwrapped around the auger sprocket 148 within the housing 140.

The chain 176 also wraps around a pair of lower idlers 178 and 180. It will be noted as illustrated in FIG. 3 that the relationship of the drive chain 176 and the auger sprocket 148 is such that auger 128 is driven clockwise viewing FIG. 3 so that front portions of the auger rotate down and under the shaft 132 when auger 128 is in operation.

The shaft 172 passes completely through the baler and exits through the left sidewall 18 as illustrated for example in FIG. 2. At that location, the shaft 172 carries an outer sprocket 182 that is entrained by a chain 184 extending downwardly through the housing 138. Within the housing 138, the chain 184 is backwrapped around the left auger sprocket 146, before then wrapping around a suitable sprocket (not shown) associated with the driving means of the pickup 70. It is to be noted as illustrated in FIG. 2, for example, that the relationship between the chain 184 and the left auger sprocket 146 is such that the sprocket 146 is driven in a counterclockwise direction viewing FIG. 2. This causes the left auger 126 to likewise be driven in a counterclockwise direction viewing FIG. 2 such that front portions of the auger 126 move down and under the auger shaft 130 during operation.

As also shown in FIG. 2, the projecting end of the shaft 172 carries a second sprocket 186 inboard of the outer sprocket 182. The second sprocket 186 is wrapped by a drive chain 188 that is also wrapped around a lower sprocket 190 on stuffer shaft 98. Thus, chain 188, sprocket 190 and shaft 98 serve as the means for supplying driving power to the stuffer mechanism 92.

As illustrated best in FIGS. 1 and 5, the baler is provided with a long windguard 192 that is pivotally connected at its forward end to the baler frame by a horizontal pivot 194 so that the windguard 192 may swing freely up and down between the alternate positions of FIGS. 1 and 5. Although not illustrated in detail, it will be understood by those skilled in the art that the windguard 192 is in the nature of a grill with a series of long fingers 193 disposed in side-by-side relationship across the width of the pickup 70, except for the outboard portions ahead of the stub augers 126 and 128. There are no fingers at those locations. The fingers 193 curve gently upwardly at their inner ends and overlie the ramp 88. The windguard 192 thus cooperates with the surface of the pickup wrapper 76 and the ramp 88 to form a kind of tunnel that confines and guides the crop stream as it flows from the front of the pickup into the baling chamber 22.

In the preferred embodiment, the baler 10 is provided with suitable means for wrapping a finished bale before discharging it from the machine. Such wrapping mechanism may take a number of different forms and comprises no part of the present invention per se. A twine dispensing tube 196 is schematically illustrated in FIGS. 1, 2 and 3 for use in carrying out the wrapping or binding function. Once the bale has been fully wrapped, the rear halves of the sidewalls 18,20, along with the rolls 48, 50, 52, and 54, may be swung rearwardly and upwardly in the nature of a tailgate 198 to open the baling chamber 22 and discharge the bale. A pair of hydraulic cylinders 200 and 202 on opposite sides of the baler may be used to swing the tailgate 198 between its open and closed positions about an upwardly located pivot 204 in a clam-shell type action.

OPERATION

As the baler 10 moves across a field, the baling chamber 22 is initially relatively small as illustrated in phantom lines in FIG. 1. As crop material is encountered by the pickup 70, the material is lifted off the ground by the rake tines 72 in a continuous flowing stream as illustrated in FIG. 5, passing under the windguard and moving to the rear extremity of the pickup wrapper straps 76 where it transitions to the front lip of the ramp 88. At that location, the rapidly moving stuffer 92 engages the flow and sweeps it in a flinging action upwardly and rearwardly through the inlet 68 and into the baling chamber 22. As the material engages the upwardly moving rear belt stretch 24, it is urged even deeper up into the baling chamber, where it is contacted by the downwardly moving front belt stretch 24a. This application of simultaneous, oppositely directed coiling forces on opposite front and rear sides of the material causes it to tumble and roll forwardly so as to quickly form a tumbling core that is larger than the front-to-rear distance between the drive roll 26 and the tailgate roll 52.

As additional material is fed into the chamber 22, the growing bale causes the chamber 22 to expand, forcing the slack arm assembly 62 to yield upwardly and causing the belt stretches 24a and 24b to bow out forwardly and rearwardly respectively. As the rear belt stretch 24b bows out more and more toward the rear, it effectively lays down against the roll 54, which has the effect of producing a kind of "live" infeed ramp that stretches across the tops of the two rolls 52 and 54. This also has the effect of moving the bale up away from the immediate vicinity of the inlet 68 to prevent obstruction of the inlet by sagging portions of the bale. Furthermore, the live infeed ramp created by the rear belt stretch 24b cooperates with the spinning periphery of the bale to form an aggressive, relatively large size nip 69 at the bottom of the bale that is quite active in drawing in new material and conveying it rearwardly around the lower back side of the bale. Once the bale is fully formed, it can be tied and then discharged as earlier described.

As illustrated particularly in FIG. 6, the crop stream 206 flowing into the baler has a central portion 206a that flows straight into the inlet 68 and is defined generally by the opposite lateral extremities of the inlet 68. Additionally, the stream has outboard margins 206b and 206c that extend generally from each lateral extremity of the inlet 68 outwardly to the respective end wall 114 or 116 of the auger assembly 110. These outboard margins 206b and 206c travel straight into the augers 126 and 128 along the top of the pickup 70, but then are converged centrally by the inwardly moving auger vanes 134 and 136. Moreover, because the front portions of the stub augers 126 and 128 are rotating downwardly, the outboard crop margins are drawn under the augers 126 and 128 as they are directed inwardly toward the center of the machine. The materials continue inwardly until reaching the inner ends of the augers 126 and 128, where they are released to the stuffer 92 and charged into the baling chamber 22.

It will be noted that converging the outboard margins 206b and 206c in this manner makes the crop stream have a heavier concentration of crop materials at its outer edges in the baling chamber than would otherwise be the case. Consequently, bale shape tends to be significantly improved.

Moreover, by arranging the augers 126 and 128 for down-turning rotation along their front extremities, the crop materials coming in from the outboard margins 206b and 206c are presented to the stuffer 92 down at its most effective operating level, i.e., down at the level of the ramp 88. This permits the teeth 94 of the stuffer 92 to penetrate deeply into the mass of incoming material and have a strong, positive feeding effect on the material as the stuffer moves through its charging stroke. If the augers 126 and 128 were up-turning at their front portions, it can be seen from viewing FIG. 5, for example, that the outboard material would move up and over the augers in more of a loose, fluffing action and tend to ride high off the ramp 88 at the point of transition to the stuffer 92, making the stuffer stroke less positive and secure with respect to those outboard materials. This could lead to turbulence, build-up and plugging instead of smooth, laminar flow. The windguard 192 is especially helpful in obtaining the smooth "tunnel effect" for the crop stream as it moves to the baling chamber, and by having the outboard materials come off the augers 126 and 128 at a point generally lower than the windguard 192, such outboard materials also participate in the tunneling action right along with the main bulk of the stream.

Still further, it will be appreciated that having the outboard crop materials move down and under the augers 126 and 128 helps keep the overhead belts 24 out of contact with the flowing crop stream. This reduces the tendency for residue to accumulate between the drive rolls 26 and 28 on top of the lower belt stretch spanning those two rolls and also provides additional freedom in selecting the positions for the rolls 26,28 and their relationship with other components in the region. In a preferred form, there is no starter roll situated downwardly and rearwardly from the rear drive roll 26, although such starter roll may be present without departing from the principles of the present invention.

ALTERNATE EMBODIMENT

Figure 7:
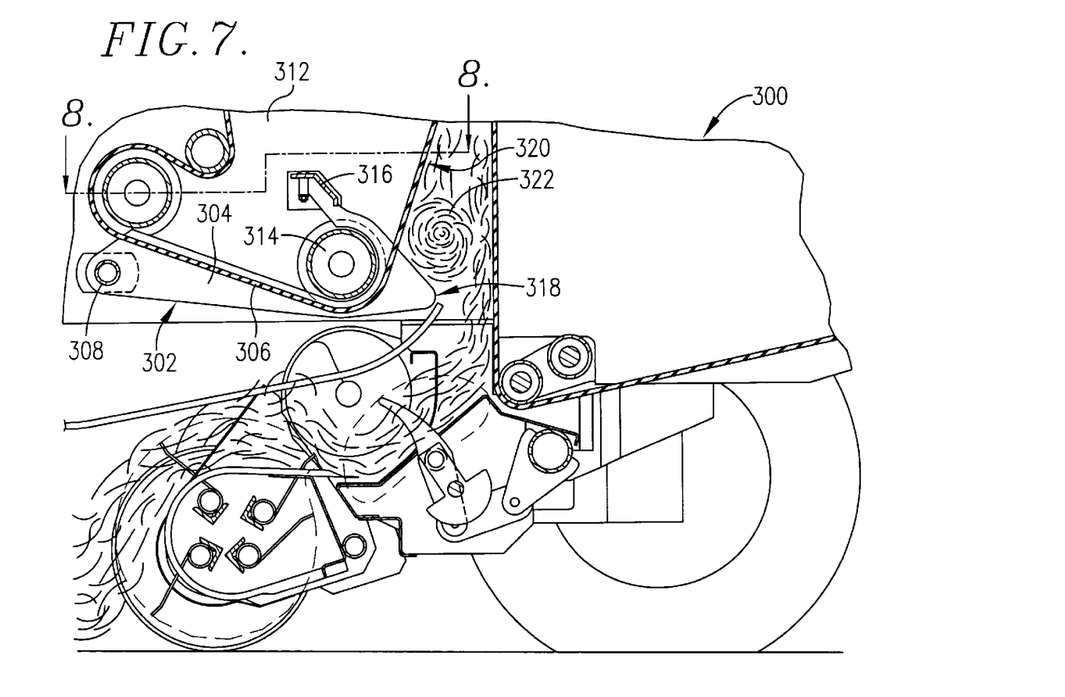
FIG. 7 is a fragmentary, vertical cross-sectional view of an alternative embodiment of the baler illustrating the use of a bale starting and control grid which may be helpful in certain crop conditions.
Figure 8:
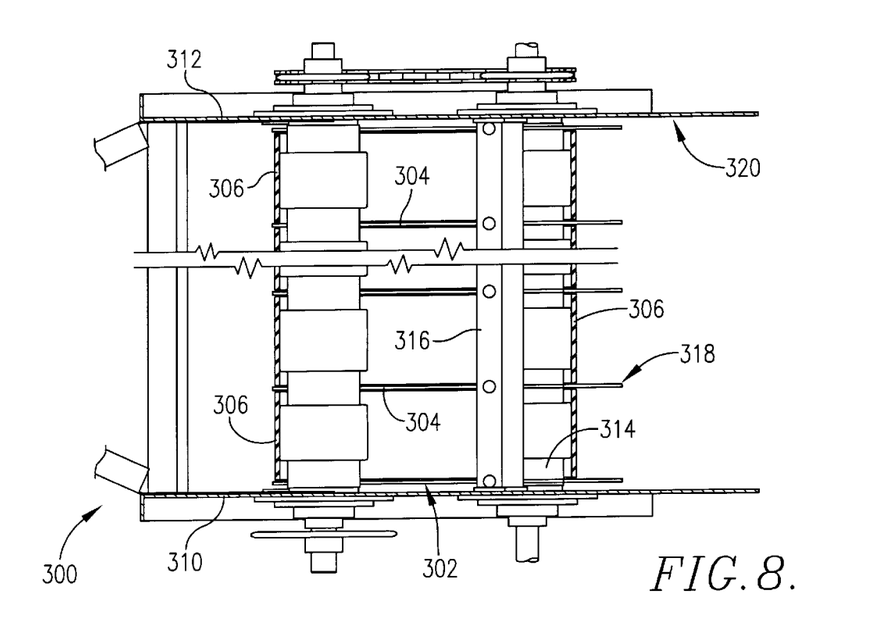
FIG. 8 is a fragmentary, horizontal cross-sectional view of the inlet area of the alternative embodiment of FIG. 7 taken substantially along line 8—8 of FIG. 7.

FIGS. 7 and 8 illustrate a baler 300 which is identical in all respects to the baler 10 of the first embodiment, with the exception that a special grid 302 has been added for use in certain adverse crop conditions. Briefly stated, the grid 302 has a series of bars 304 that extend fore-and-aft and are spaced apart laterally of the machine in interspersed relation with the belts 306. The bars 304 are all secured at their forward ends to a common crosspipe 308 that is secured at its opposite ends to the sidewalls 310 and 312 of the baler 300. The bars 304 are relatively flat and thin and are disposed on edge such that their upper edges project upwardly through the space between adjacent belts 306 while their lower main portions and bottom edge project substantially down beyond the belts 306.

At their rear ends, the bars 304 curve around the rear drive roller 314 and continue upwardly and forwardly to a transverse, common mounting bar 316 that is attached at its opposite ends to sidewalls 310 and 312. The bars 304 are configured to present a tapered nose or shelf 318 in the area that wraps around the drive roll 314 so that the shelf 318 is disposed within the baling chamber 320 and provides a small, stationary support for the bale core 322 when the bale is first forming. This helps keep the newly forming core from falling back down out of the chamber 320 at start up, which can sometimes be a problem in particularly heavy damp conditions. Furthermore, the bars 304 between and beneath the belts 306 help keep incoming crop materials away from the overhead belts and rolls so as to reduce the accumulation of residue at those locations.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler having a bale chamber provided with a crop inlet, the improvement comprising:

a crop pickup spaced downwardly and forwardly from said inlet for picking up crop materials from the ground as the baler moves across a field and for feeding the picked up materials in a stream toward the inlet;

an infeed ramp leading upwardly and rearwardly from the pickup for guiding materials to the inlet;

stuffer mechanism associated with said ramp for receiving the stream of crop materials from the pickup and for feeding the materials upwardly along the ramp to said inlet, said pickup being wider than the inlet for creating a crop stream that is wider than the inlet;

a pair of laterally spaced apart, opposed stub augers at the lower end of the ramp for engaging opposite outboard margins of the crop stream as it flows from the pickup to the infeed ramp and for consolidating the stream centrally until it is at least substantially no wider than the inlet; and apparatus for driving said stub augers in such a direction that forward portions of the augers turn down and under the axes of rotation of the augers for causing outboard margins of the stream to flow down and under the augers as they are converged centrally to the stuffer mechanism, said ramp having a plurality of longitudinally extending clearance slots therein arranged in a transverse row, said stuffer mechanism including a plurality of teeth that are projected upwardly through the clearance slots from beneath the ramp.

2. In a round baler as claimed in claim 1, said bale chamber being capable of expanding during operation to accommodate growth of a bale forming therein.

3. In a round baler as claimed in claim 2, said bale chamber being formed in part by a plurality of transverse rolls and a plurality of belts entrained around the rolls, said chamber being initially small and generally upright with the inlet located generally at the bottom of the chamber, said chamber being formed initially by a generally upwardly moving, rear stretch of the belts and a generally downwardly moving front stretch of the belts.

4. In a round baler as claimed in claim 3, said inlet being formed between a pair of rolls that are spaced apart in a generally fore-and-aft direction, said rear belt stretch being looped under a rear one of said spaced apart rolls, there being a second rear roll positioned a short distance upwardly and rearwardly behind said first-mentioned rear roll in disposition to be out of contact with the rear belt stretch when the bale chamber is initially small and upright but to engage and support the rear belt stretch when the bale reaches such a size during its growth in the chamber that the bale becomes supported at least in part by the second rear roll.

5. In a round baler as claimed in claim 4, said forward roll of said pair of fore-and-aft spaced rolls comprising a first drive roll, said front belt stretch being looped under said first drive roll for being driven thereby, there being a second drive roll spaced forwardly from said first drive roll, said front belt stretch also being looped under said second drive roll such that the front belt stretch is pulled from the first drive roll by the second drive roll.

6. In a round baler as claimed in claim 3, said inlet being formed between a pair of rolls that are spaced apart in a generally fore-and-aft direction, the forward roll of said pair of fore-and-aft spaced rolls comprising a first drive roll, said front belt stretch being looped under said first drive roll for being driven thereby, there being a second drive roll spaced forwardly from said first drive roll, said front belt stretch also being looped under said second drive roll such that the front belt stretch is pulled from the first drive roll by the second drive roll.

\* \* \* \* \*